United States Patent Office 3,433,309
Patented Mar. 18, 1969

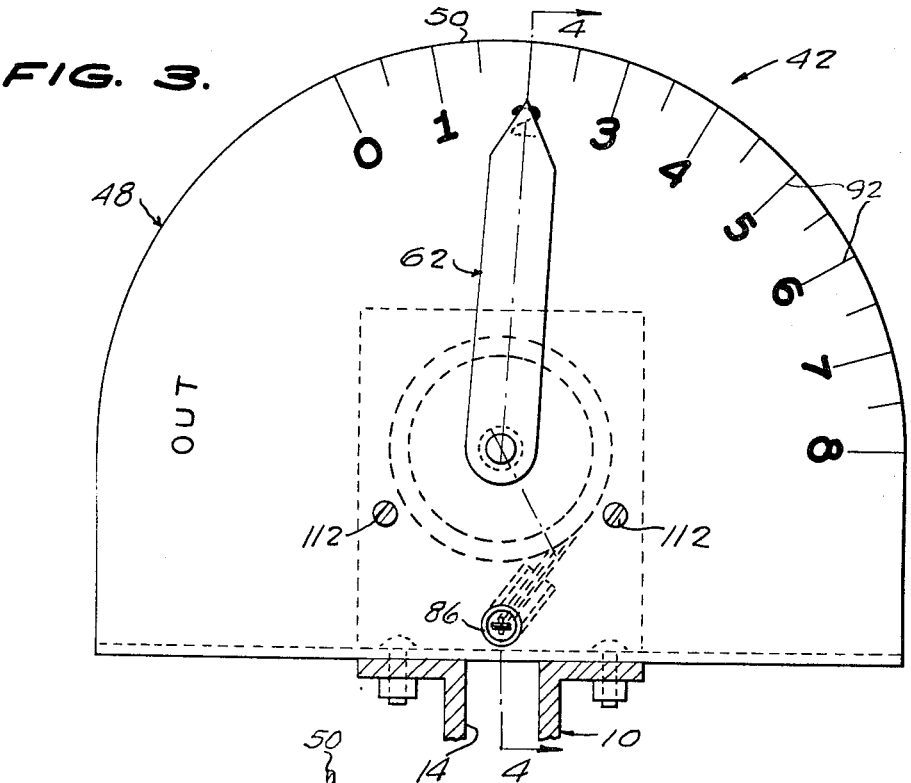
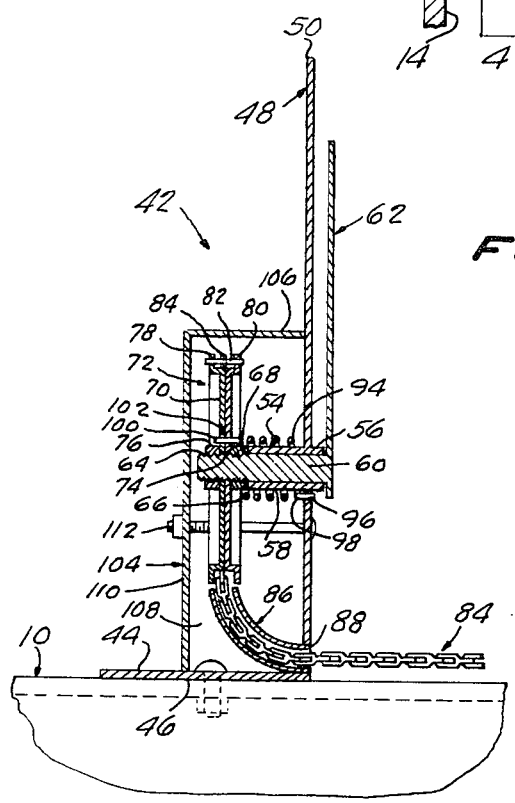

3,433,309
AGRICULTURAL IMPLEMENT WORKING
DEPTH GAUGE
Henry L. Michaelis, Box 152, and Larry D. Michaelis,
both of Utica, Kans. 67584
Filed Jan. 7, 1966, Ser. No. 519,282
U.S. Cl. 172—430                                     1 Claim
Int. Cl. A01b 65/06, 71/02; G09f 9/40

ABSTRACT OF THE DISCLOSURE

A tool depth indicator for an agricultural implement of the type having a depending tool and a hydraulically-operated actuating lever controlling the position of a ground-engaging depth wheel. The indicator consists of a dial plate fixed to the implement and a rotary pointer on a shaft journalled in the dial plate. A peripherally-grooved wheel is secured on the shaft. A chain is secured on the periphery of the wheel and extends through a fixed guide tube to the actuating lever. A spring acts on the wheel in a direction to maintain the chain taut.

---

This invention relates to a working depth gauge, for agricultural implements, adapted to be connected to a hydraulic ram-operated lever which is operatively associated with an implement adapted to be raised and lowered relative to the ground.

The primary object of the present invention is the provision of a simple, mechanically superior, protectively enclosed, long-lived, and more readily visible device of the kind indicated, which is easily removed from and installed on a variety of agricultural machines; and which device is not directly dependent upon the piston travel of a hydraulic cylinder for accurate indications of the depth at which an implement is adapted to be set relative to the ground.

Another object of the invention is the provision of a device of the character indicated above, which is substantially vibration proof, in the interest of constant accurate visual readings thereof, and corresponding accurate maintenance of implement depth; and which enables unobstructed and unencumbered lifting out of implements, as at the ends of turns, and subsequent accurate lowerings of the implements to and maintenance of implements at the predetermined depths.

In the drawings:

FIGURE 3 is an enlarged vertical transverse section, taken on the line 3—3 of FIGURE 2; and, FIGURE 4 is a vertical section, taken on the line 4—4 of FIGURE 3.

Figure 1:
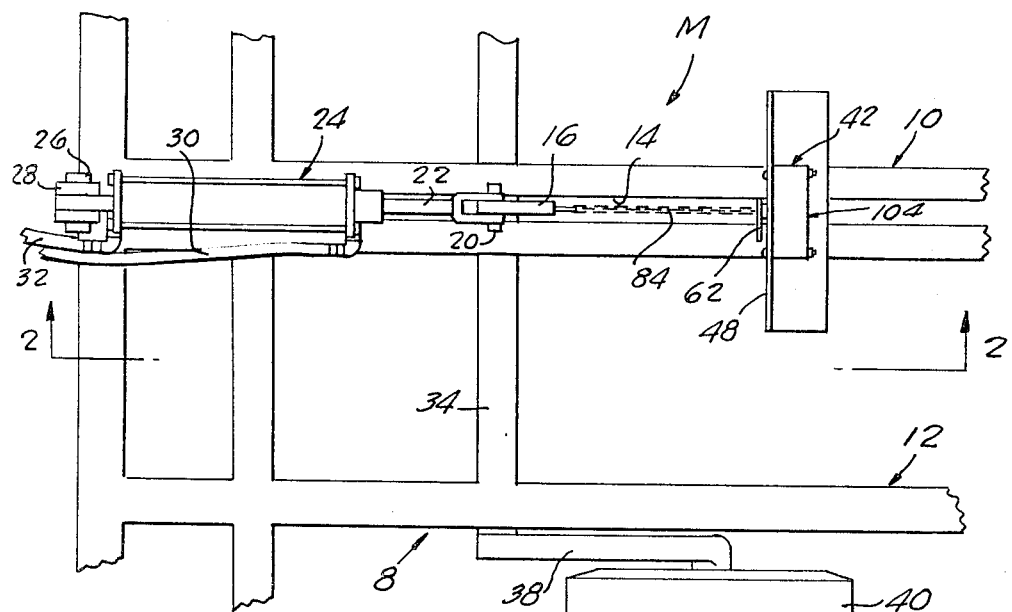
FIGURE 1 is a fragmentary top plan view of an agricultural machine, equipped with a device of the invention.
Figure 2:
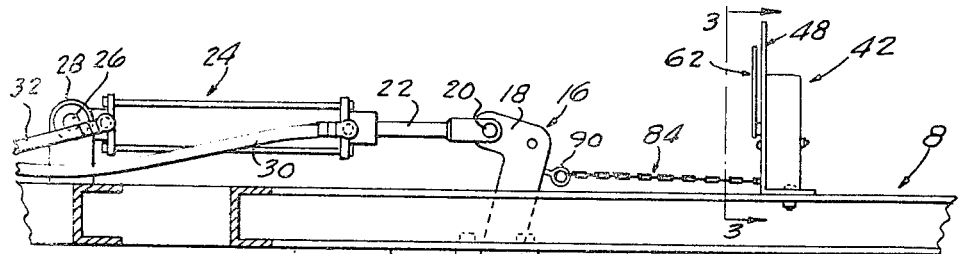
FIGURE 2 is a vertical longitudinal section, taken on the line 2—2 of FIGURE 1, showing, in phantom lines, an implement set at a predetermined depth in the ground.
Figure 2:
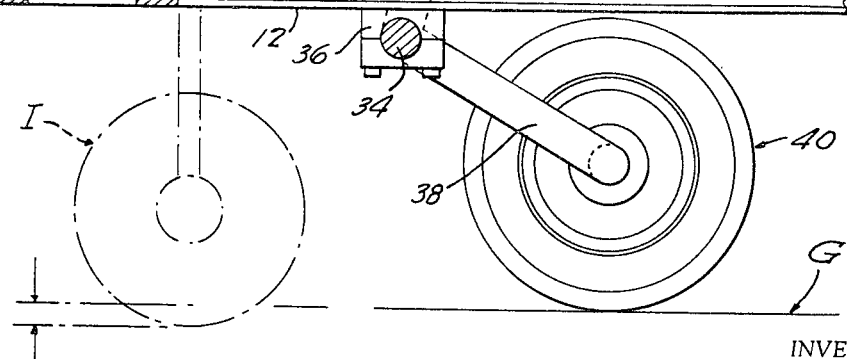

Referring in detail to the drawings, M designates an agricultural machine having a horizontal frame 8 which includes a first horizontal longitudinal member 10, spaced laterally with respect to a second horizontal longitudinal member 12. The first member 10 is formed with a longitudinal slot 14 through which works an upstanding inverted L-shaped lever 16, having a forwardly extending horizontal arm 18, on its upper end, to the forward end of which is pivoted, as indicated at 20, the rear end of the piston rod 22, extending from the rear end of a two-way horizontal hydraulic cylinder or ram 24. The cylinder 24, at its forward end, is pivotally anchored, as indicated at 26, to an upstanding bracket 28, fixed upon the frame member 10. Suitable hydraulic lines 30 and 32 are severally connected to related ends of the cylinder 24.

The lever 16 is fixed, at its lower end, to a transverse horizontal shaft 34, journalled through a bearing bracket 36, fixed to the underside of the second frame member 12, the shaft 34 having a fixed downwardly and rearwardly extending arm 38, on the lower end of which is journalled a depth wheel 40, adapted to roll upon the surface of the ground G. Elevation and depression of the wheel 40, relative to the machine frame serves to determine the depth of penetration, into the ground G, of any ground-working implement carried by the machine M, behind the wheel 40, when the wheel 40 is in an elevated position; and to raise the implement out of the ground, in a depressed position of the wheel 40, these positionings of the wheel 40 being obtained by operation of the cylinder 24. Such an implement generically designated I, and shown in phantom lines, is mounted on and extends downwardly from the frame 8, behind the depth wheel 40.

In accordance with the present invention, accurate visual observation, from a point forwardly of the cylinder 24, as from a driver's seat, of the working depth, in the ground G, of the implement I, is provided for by the installation, one the frame 8, behind the lever 16, and preferably in line therewith on the first frame member 10, of a visual depth gauge 42, which is operatively connected to the depth wheel lever 16.

As shown in FIGURES 3 and 4, the depth gauge 42 comprises a horizontal base plate 44, adapted to be fixed in place upon the machine frame member 10, as by means of bolts 46. An upstanding perpendicular forwardly facing dial plate 48 is suitably fixed, at its lower end, to the rear edge of the base plate 44, and preferably has a semicircular upper edge 50. The dial plate 48 is formed, concentric with its upper edge 50, with a round hole through which a horizontal tubular bushing 54 extends. The bushing 54 is suitably fixed to the dial plate and has a short forward end portion 56 extending forwardly from the dial plate 48, and a main portion 58 extending rearwardly from the dial plate.

A spindle 60, longer than the bushing 54, is suitably journalled through the bushing, and has suitably fixed, on its forward end, an upstanding pointer 62, which is wider than the spindle and can bear against the forward end of the bushing 54, whereby the pointer 62 is spaced out of contact with the front side of the dial plate 48.

The spindle 60 has a threaded rear end portion 64, extending beyond the rear end 66, of the bushing 54, on which a front lock nut 68 is threaded, and bears against the rear end 66. The flat dual web 70 of a pulley wheel 72 is formed with a central opening 74 accepting the threaded spindle portion 64, and a rear lock nut 76 is threaded on the portion 64, for clamping the web 70 between the nuts. The wheel 72 has a channel rim 78, on its web 70, having spaced sidewalls 80, which, at one point of the circumference of the rim, are traversed by a chain anchor pin 82.

An open link chain 84, differing from a sprocket chain, is trained around and in the channel rim 78, and, at its related end, is secured to the anchor pin 82, and leads downwardly off one side of the pulley wheel 72.

A forwardly and downwardly curved tubular chain guide 86, is suitably fixed, at its depressed forward end, in an opening 88, provided in the lower central part of the dial plate 48, through which the chain 84 is slidably engaged to emerge forwardly from the gauge 42, on a level with an eye 90, fixed to and extending rearwardly from the lever 16, on a level above the frame 8, to which the forward end of the chain 84 is secured.

An open link chain 84 is preferred over closed link forms of chains, such as sprocket chains, because the open links are proof against being seized or being clogged, as by rust or debris, when the gauge is in storage, or is in place on a machine, in contrast to other types of chains.

The dial plate 48 is marked, on its front surface, with radial circumferentially spaced gauge scale marks 92, along its arcuate upper edge 50, which are accompanied by numerals from "0" to "8," for example, running clockwise, and indicating inches of ground penetration of the associated implement I, the area of the dial plate to the left of the "0" mark being left blank, except for the word "out," or the equivalent, indicating that the implement is elevated above ground, when the pointer 62 is positioned thereat.

For normally positioning the pointer 62, beyond the "0" mark, a coil spring 94 is circumposed on the bushing 54 and has one end 96 securably engaged through an opening 98, in the dial plate 48, and another end 100 securably engaged through an opening 102, provided in the web of the pulley wheel 72.

For weather protection for the moving parts of the gauge, and to prevent access thereto of debris, such as weeds, and injurious contacts therewith of the hands of workers, a removable case 104 is provided. The case 104 comprises a rectangular hollow form composed of a top wall 106, and side walls 108, the free edges of which bear against the rear side of the dial plate 48, and a back wall 110 whose lower edge, in common with the lower edges of the side walls 108, bear upon the base plate 44. Bolts 112 extend through the back wall 110, at opposite sides of the pulley wheel 72, and through the dial plate 48, and hold the case 104 securably in place.

In use and operation, the operator of the machine M, having decided at what depth in the ground G the implement I is to be worked, looks back from his seat on the machine, operates the hydraulic cylinder 24, in a direction to elevate the ground wheel 40, relative to the frame 8, until the pointer 62, of the depth gauge 42, registers with the scale mark 92 designating the selected depth. On reaching the end of a field row, prepartory to making a turn, the operator works the hydraulic cylinder 24, in a direction to depress the depth wheel 40, until the implement I is pulled up out of the ground G. The turn of the machine M is then executed, and the implement I again let down to the originally selected depth in the ground indicated by the gauge pointer 62 being returned to the previously selected gauge mark 92. The gauge spring 94 serves to rotate the pointer 62 and the pulley wheel 72, so as to take up the slack in the chain 84, and to move the pointer beyond the "0" scale mark, to the "out" area of the dial plate, as the implement I is drawn up out of the ground, preliminary to executing a turn of the machine M.

What is claimed is:

1. In combination, an agricultural machine having a wheel-supported frame, a depth wheel positioned below the frame and adapted to roll on the ground, a shaft journalled on and extending transversely across the frame, a downwardly-angled arm fixed to the shaft, means rotatably-mounting said depth wheel on the lower end of said arm, an upstanding lever fixed to said shaft, a hydraulic cylinder swingably-mounted on the frame substantially in longitudinal alignment with said lever and having a piston rod pivotally-connected to said lever, means to operate the piston rod in opposite directions for elevating and depressing the depth wheel relative to the frame, a depending ground-working implement fixed to said frame, said implement being adapted to be lifted out of the ground and depressed into the ground responsive to the respective depressing and elevating of the depth wheel, a base plate fixed to the frame at the side of the lever remote from said hydraulic cylinder, a transverse upstanding dial plate on said base plate having a scale side facing the hydraulic cylinder, a horizontal cylindrical bushing rigidly-secured to and extending through said dial plate, said bushing having a relatively short forward end portion projecting forwardly from the dial plate and a relatively long portion projecting rearwardly from the dial plate, a spindle journalled in said bushing, an upstanding pointer rigidly-secured to the forward end of said spindle and being rotatably-engageable against the forward end of said bushing, a wheel assembly transversely-secured on the rear end of the spindle and being rotatably-engageable against the rear end of said bushing, a coil spring surrounding and supported on said bushing, means securing one end of the spring to said dial plate, means securing the other end of the spring to said wheel assembly, said wheel assembly including a transverse wheel having an outwardly-facing channel-shaped periphery, an arcuate tubular chain guide mounted below said wheel and having its top end substantially in tangential alignment with the wheel periphery and having its bottom end substantially in alignment with said lever, an open link chain extending slidably through said tubular chain guide, means connecting one end link of said chain to said lever, and a pin extending transversely through the channel-shaped periphery of said wheel and through the opposite end link of said chain, whereby to connect the chain between the periphery of the wheel and the lever so that the chain is receivable in the channeled periphery of the wheel, said coil spring being mounted so as to bias the wheel in a direction to wind the chain thereon, maintaining the chain taut, whereby the pointer is positioned adjacent the scale side of the dial plate in accordance with the position of the depth wheel.

References Cited

UNITED STATES PATENTS

| 469,823 | 3/1892 | Hannan | 116—127 |
|---|---|---|---|
| 2,589,896 | 3/1952 | Toland | 116—124 |
| 2,704,047 | 3/1955 | Lushenko | 116—124 |

FOREIGN PATENTS 577,411   5/1958   Italy.

ABRAHAM G. STONE, Primary Examiner

R. C. HARRINGTON, Assistant Examiner.

U.S. Cl. X.R.

116—124